July 19, 1927. 1,636,242
J. PRACHAR
APPARATUS FOR AND METHOD OF FORMING STORAGE BATTERY GRIDS
Filed Jan. 3, 1921 4 Sheets-Sheet 1

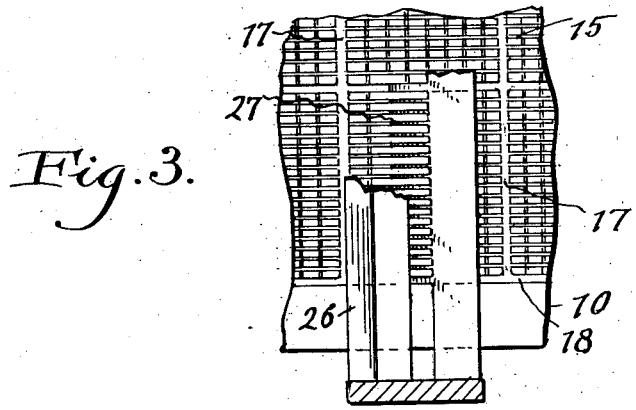
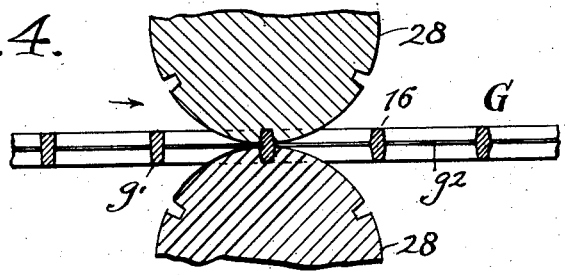
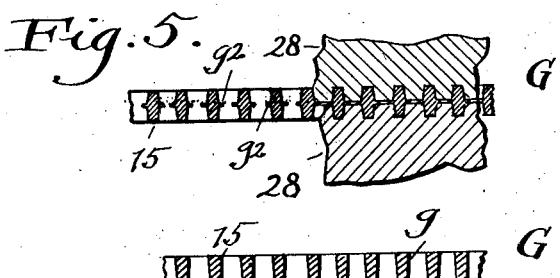
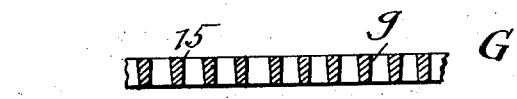

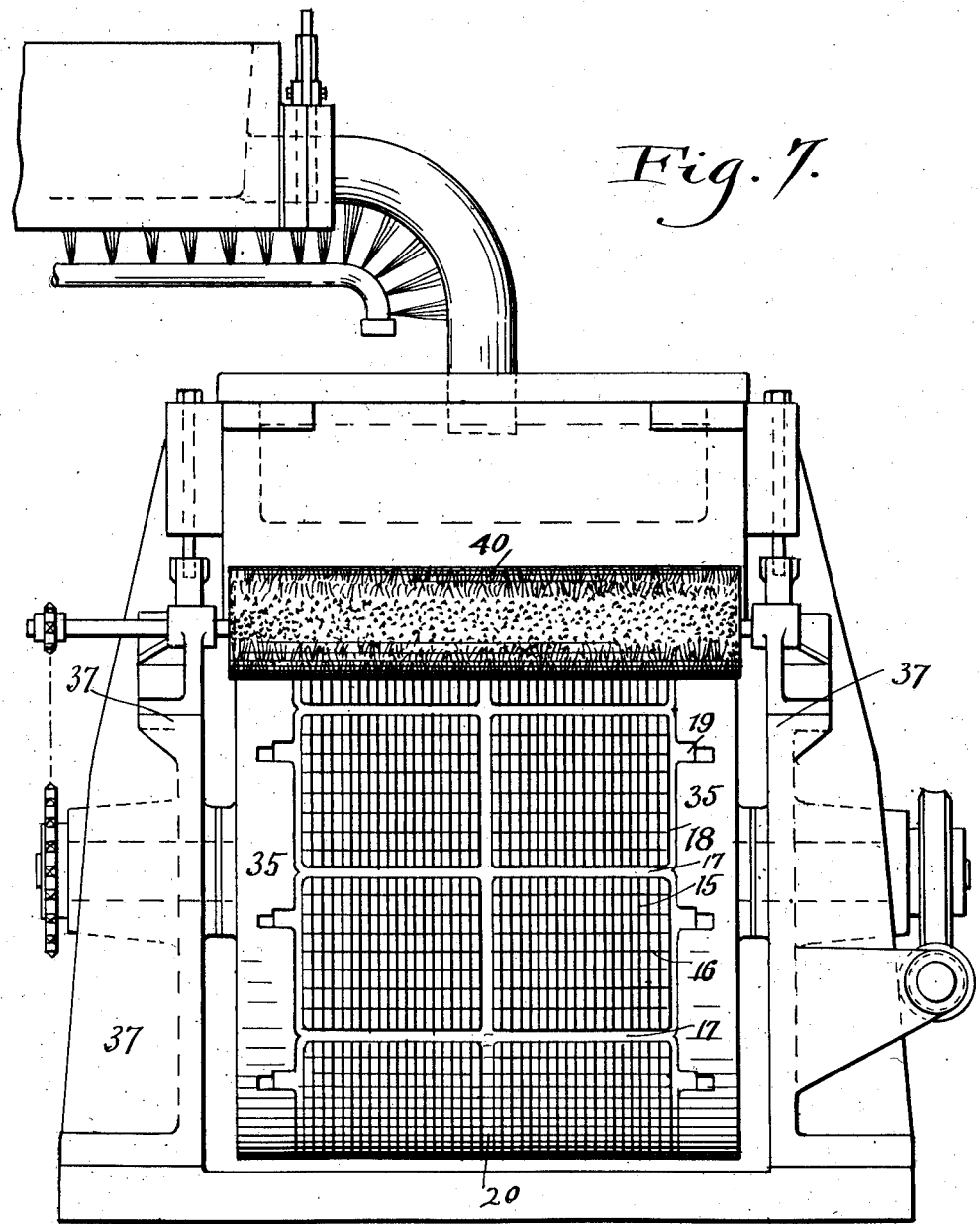

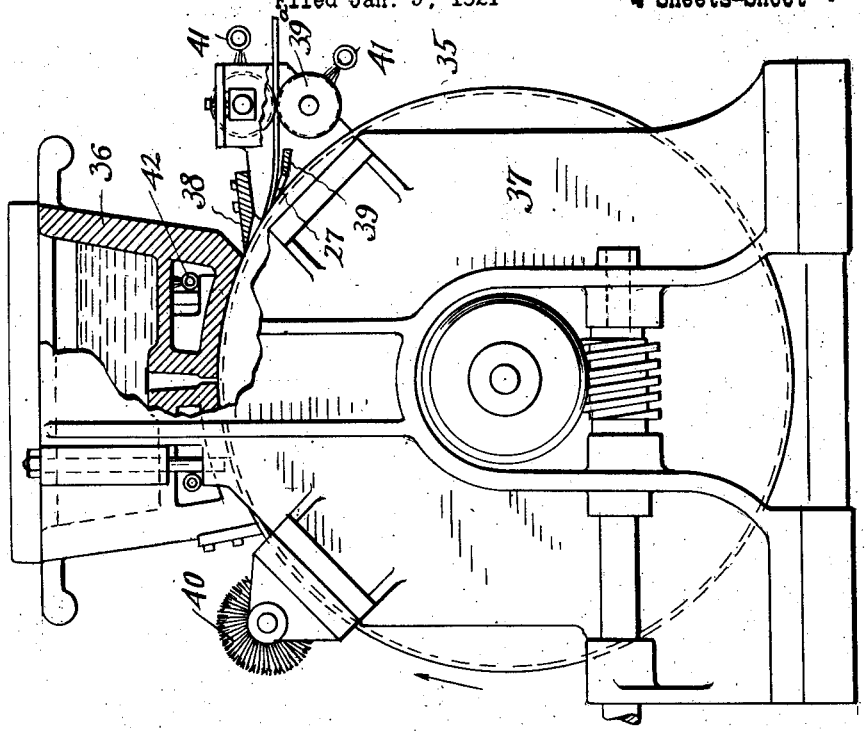
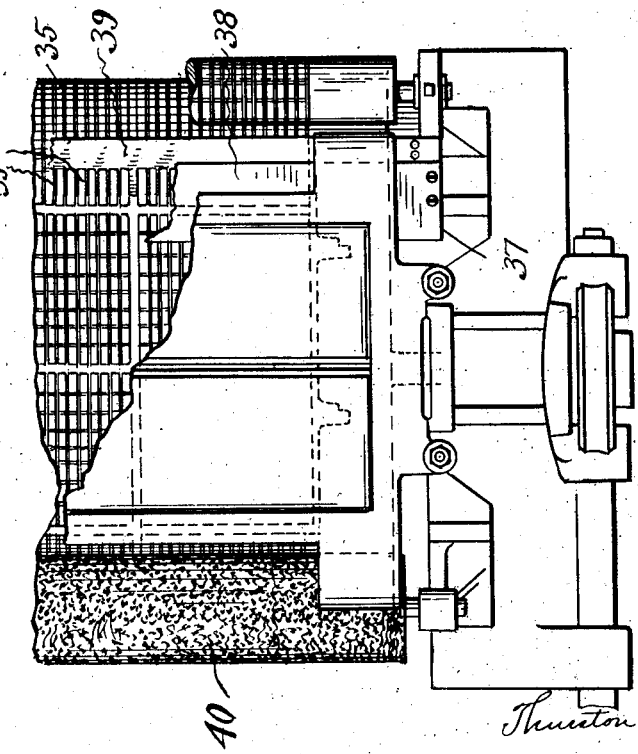

Patented July 19, 1927.

1,636,242

UNITED STATES PATENT OFFICE.

JOHN PRACHAR, OF CLEVELAND, OHIO, ASSIGNOR TO THE HAZELETT STORAGE BATTERY COMPANY, OF CLEVELAND, OHIO, A CORPORATION OF OHIO.

APPARATUS FOR AND METHOD OF FORMING STORAGE-BATTERY GRIDS.

Application filed January 3, 1921. Serial No. 434,495.

This invention relates to a method and apparatus for forming certain articles, particularly lead storage battery grids, and has for its principal object to decrease the cost of production of storage battery grids as well as to provide an improved form of grid.

In accordance with the present invention molten metal is cast into substantially the form of the finished grids on the surface of a rotating cylinder whose surface is enveloped by a series of continuous grid molds.

By pouring the metal onto the surface of this cylinder, or rather between the surface of the cylinder and the stationary arc-shaped member which closely engages the surface of the cylinder, the grids are cast in semi-finished form and they may be conducted from the cylinder in the form of a continuous strip. Then the strip is preferably passed through a pair of finishing rolls which gives a finished shape to the ribs making the shape on one side of the grid uniform with the shape on the other side. After the strip passes from the rolls it may be cut transversely into double or single grids depending upon whether the strip formed on the cylinder is the width of one grid or of two grids.

The invention may be further briefly summarized as consisting in certain novel details of construction of the improved grid forming apparatus, and in certain novel steps of the improved method in forming the grids as will be described in the specification and set forth in the appended claims.

Figure 1:
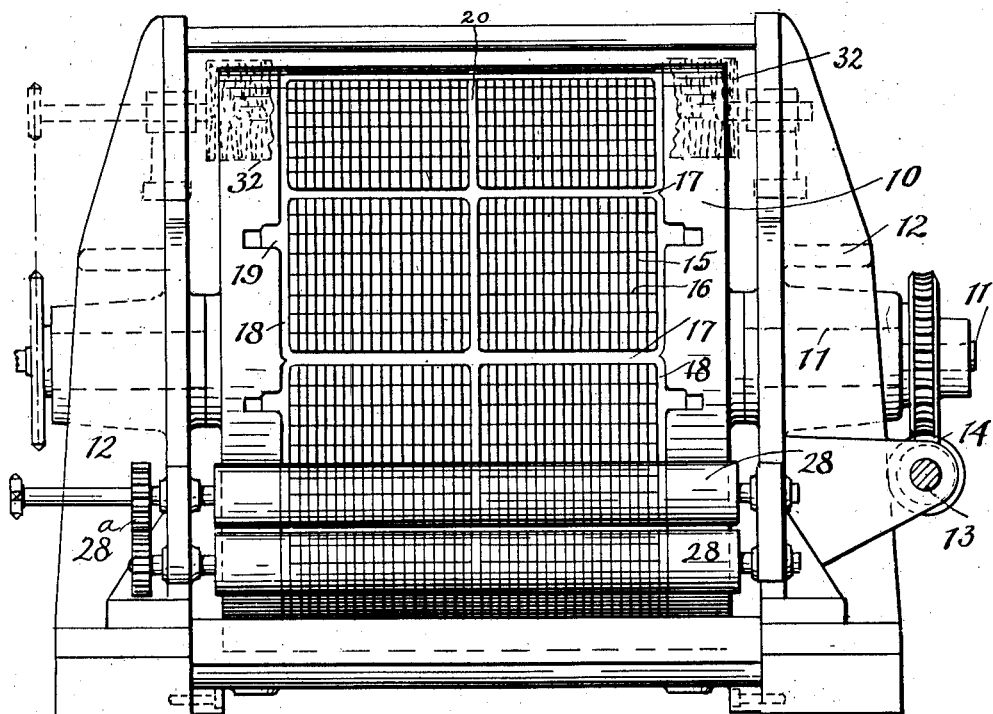
Figure 2:
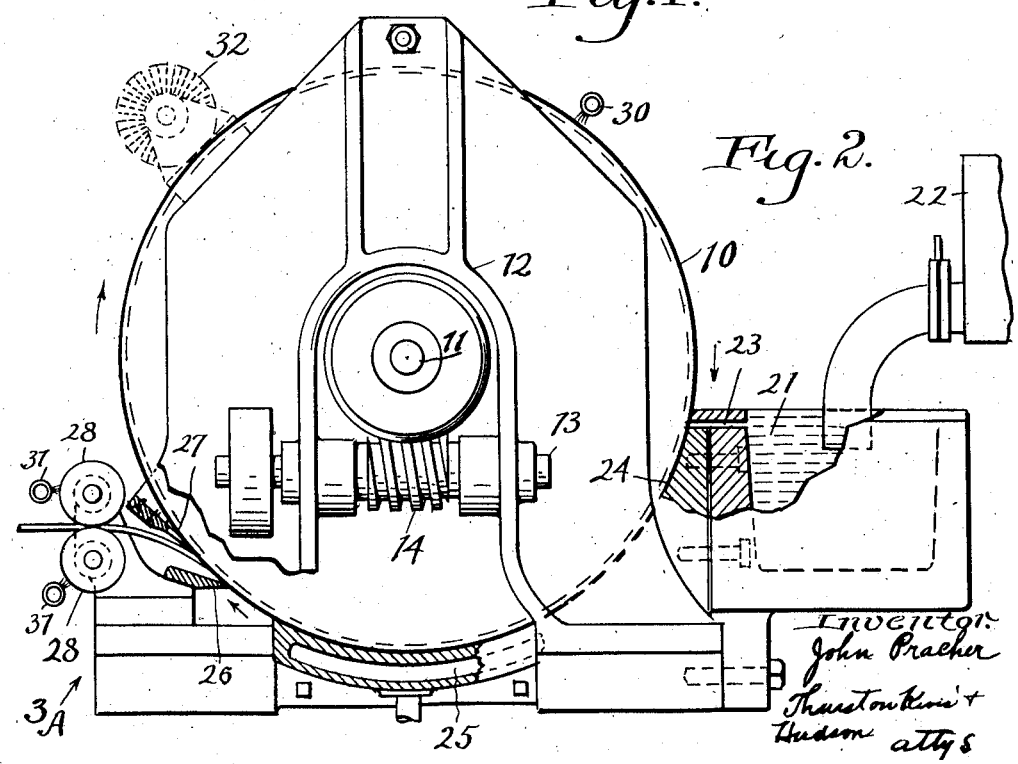

In the accompanying sheets of drawings, Fig. 1 is a side view of the preferred form of apparatus, this view showing the apparatus when viewed from the left of Fig. 2;
Fig. 2 is an end view with parts in section; Fig. 3 is a fragmentary view looking toward the cylinder in the direction indicated by the arrow marked A at the left hand corner of Fig. 2, this view showing the trimming knife and the stripping comb; Fig. 4 is a partial sectional view of the grid finishing rolls and showing a portion of the grid passing therethrough, the section being taken transversely of the rolls; Fig. 5 is a similar view with a section taken longitudinally of the rolls; Fig. 6 is a transverse section through a portion of one of the grids as it is formed on the casting cylinder and showing the shape of the ribs before the latter are finished in the finishing rolls; Fig. 7 is a side view showing a modification, this view showing the apparatus viewed from the left hand side of Fig. 8; Fig. 8 is an end view of the machine shown in Fig. 7;
Fig. 9 is a top plan view of a portion of the machine shown in Figs. 7 and 8.

Referring now to the drawings, the apparatus includes a rotary casting cylinder 10 supported on a shaft 11, journaled in the ends 12 of a stationary frame, this cylinder being preferably formed of cast iron. This shaft 11, may be driven by any suitable means such as by means of a shaft 13 shown in Fig. 2. which is connected to the shaft 11, by worm gearing 14.

Cut into the surface of the cylinder are a series of grid molds which in this instance are continuous so that the grids after being cast can be led from the cylinder in the form of a continuous strip. In this instance the grids are not only cast in the form of a continuous strip, but double grids are formed, that is to say, when the strip is cut transversely into sections of the width of a grid, the cut off sections each consist of two grids end to end, which may be divided into single grids by cutting the section at the center. By reference to Fig. 1 it will be observed that each grid forming mold has rather close circumferentially formed rib forming grooves 15 (which form the horizontal ribs of a grid) and it is provided also with grooves 16 at right angles to the grooves 15 spaced somewhat further apart than the latter, the grooves 16 forming the vertical ribs of a grid. The contiguous double grid molds are joined together by fairly wide grooves 17, in which are formed the bars or portions of lead adapted to be divided centrally to separate each double grid from the adjoining double grid. Additionally the contiguous grid molds are bounded by circumferential grooves 18 which form the ends of the grids, these having lug forming extensions 19, by which the lugs are formed on opposite ends of each double grid. Likewise there is a central groove 20 which forms a bar or strip of lead which is adapted to be cut centrally to divide the double grid sections into single grids.

The metal is poured into the grid molds on the surface of the cylinder from a reservoir 21 to which metal in liquid form is supplied from a melting pot, a portion of which is shown at 22. It will be observed by reference to Fig. 2 that this reservoir 21 is located alongside the cylinder below its center.

The metal flows or is delivered from the reservoir 21 into the grid molds of the cylinder through an orifice or gate 23 which will extend the full width of the strip to be cast. The metal runs into the circumferentially and axially disposed grooves forming the grid molds, between the surface of the cylinder and a stationary mold block 24 having a cylindrical surface which conforms to the cylindrical shape of the cylinder, and which the latter closely engages, this block being preferably formed of bronze. This block extends from the gate 23 down around the cylinder to the lower portion, being in this instance in engagement with the cylinder for a little more than ninety degrees of its cylindrical surface. The metal fills all the grid forming grooves while it is conveyed between the cylinder and the mold block 24, and congeals before it passes beyond the limits of the latter. To hasten the congealing I contemplate providing the lower part of the block 24 with a passageway 25 for water to cool the block, and by regulating the flow of water the temperature of the block and of the surface portion of the cylinder and the hardness of the metal as it passes beyond the block can be nicely controlled.

A short distance beyond the mold block 24 I provide a cutter in the form of a blade 26 which extends across the surface of the cylinder in contact therewith so as to cut off any lead which may project beyond the surface of the casting cylinder, and a short distance beyond the cutting or trimming blade 26 I provide a comb 27 having teeth which extend down into all the circumferential grooves 15, 18 and 20 so as to lift or draw the molded strip from the mold, the strip passing out as shown in Fig. 2 between the cutter 26 and the comb 27.

In view of the fact that drawing clearance is necessary, naturally the ribs at the outer portions of the grooves are thicker than at the inner portions or bases of the grooves. For example, in Fig. 6 I have shown a portion of a grid G, on a slightly enlarged scale, the ribs formed by the circumferential grooves 15 being shown at $g$. In Fig. 4 are shown the ribs which are formed by the axial grooves 16, these ribs being designated $g'$. Inasmuch as storage battery grids are filled with active material consisting of compacted, finely divided substances, it is apparent that with the ribs of the shape shown in Fig. 6 there would be a tendency for the material to fall from the grids. To obviate this, I pass the strip as it extends from the cylinder, through what may be termed finishing rolls 28 which are driven so that their surface speed is the same as the surface speed of the cylinder. These rolls have grooves shown in Figs. 4 and 5, which as far as their location is concerned, are counterparts of the grooves 15 and 16 of the cylinder. The grooves of one roll 28 are the same as the grooves of the companion roll, and when the strip is run through the rolls, the rolls being quite close together as appears from Fig. 5, the shape of the ribs on one side of the strip are made the same as those on the other, and I prefer that at the center the ribs be provided while they are passing through the rolls with a slight fin designated $g^2$, this fin projecting on both sides of the ribs $g$ and serving to hold the material in place.

After the strip passes between the rolls 28 it may be cut into sections midway of the bars 17 forming the double grids which can later be divided, either before or after the grids are pasted with the active material.

I may, if necessary, provide a gas pipe 30 alongside the cylinder 10 to heat the cylinder when the machine is first started up and to coat the molds with carbon to prevent the castings sticking to the molds. Additionally I may provide similar gas pipes 31 by which flames may be directed on the rolls 28 to heat these rolls, if necessary, so as to slightly soften the metal so that the ribs can be molded into the desired finished shape which I have illustrated in the drawings. I do not regard these heating pipes as essential as the strip may be sufficiently soft when it reaches the rolls 28.

I prefer also to provide alongside the cylinder a cleaning brush 32 to clean out of the grooves any small particles of lead, the brush engaging the surface of the cylinder at any suitable point beyond the point where the strip is led from the cylinder.

By the above apparatus and process grids are formed in a continuous operation, first by casting them on the surface of the rotating cylinder into strip form with the strip composed of contiguous double grids (or single grids if desired) and then by shaping the bars or ribs of the grids by taking the strip from the cylinder and passing it through or between a pair of rolls which molds or reshapes portions of the bars or ribs, giving the latter a shape such that they are well suited to hold or retain the active material.

The machine shown in Figs. 7, 8 and 9 is in principle like that first described, differing therefrom simply in the relative arrangement of the parts which co-operate with the cylinder. In this instance the drum or cylinder corresponding to the cylinder 10 is shown at 35, this cylinder having its periphery formed into grid molds precisely like the drum 10. In this case the metal is poured from a reservoir 36 which is located above the cylinder, and is supported from the ends 37 of the frame. The bottom of the reservoir is in the form of a cylindrical surface which conforms to and rests upon the outer surface of the cylinder. As the metal passes from the reservoir into the grid molds of the cylinder the metal all passes in the direction that the cylinder is rotated, and is retained in place by the bottom of the reservoir, and when it passes beyond the bottom surface of the reservoir it is congealed. Just beyond the reservoir I provide a blade or knife 38 which peels off any excess metal which projects above the surface of the cylinder, this blade corresponding to the blade 26 of the first construction, and just beneath or beyond the blade I provide a comb 39 which lifts the strip from the drum and allows it to pass between the finishing rolls 39ª which correspond to and perform the function of the rolls 28 of the first construction. Additionally I may provide a cleaning brush 40 and heating pipes 41 may be utilized to heat the finishing rolls 39ª. Additionally I may provide in the bottom of the reservoir 36 passageways or openings to receive heating pipes 42 for maintaining metal in the reservoir at the proper temperature.

The construction and operation of the machine shown in Figs. 7, 8 and 9 is like that first described, the metal first being cast into strip form composed of the contiguous or joining double grids (or single grids as the case may be) and then the strip thus formed being stripped from the cylinder and passed through the finishing rolls which give the ribs of the grids the necessary uniformity of shape and provide them with the means for holding the active material in the interstices of the grids between the ribs.

While either form of the invention may be used, I prefer the construction first described, for the reason that the temperatures are more easily controlled, thus doing away with the necessity of a skilled operator, whereas the machine last described will require more careful attention than the first.

I do not wish to be confined to the use of the rolls in conjunction with the casting cylinder, for I believe that in casting thin grids, such, for example, as grids one-thirty-second of an inch in thickness, the shaping rolls can be dispensed with, though the latter are useful when relatively thick grids are cast.

The rolls 28 of the construction shown in Figs. 1 to 3, and the rolls 39 of the construction shown in Figs. 7 to 9 may be driven in any suitable manner by the mechanism which drives the casting cylinder, and in Fig. 1 I have shown the shaft of the upper roll 28 extended and provided at its end with a driving sprocket, and have shown the shafts of the two rolls connected in driving relation by power transmitting gears 28ª of equal size.

Having described my invention, I claim:

1. In an apparatus for forming storage battery grids, a rotary cylinder with the grid forming molds formed by grooves in its cylindrical surface, a stationary member having a cylindrical surface arranged adjacent to the cylindrical surface of the cylinder, means for supplying molten metal between the two cylindrical surfaces and into the molds, and means independent of the molds for stripping the molded grids from the cylinder.

2. In an apparatus for forming storage battery grids, means for molding a strip of grids from molten metal comprising a rotary cylinder having contiguous or joining grid molds with relatively fixed side and bottom walls formed in its cylindrical surface and composed of intersecting rib forming grooves, and a stationary member having a cylindrical surface arranged adjacent to the cylindrical surface of the cylinder, and means for supplying metal into the molds between the two cylindrical surfaces.

3. An apparatus for forming storage battery grids comprising a cylinder having grid forming molds on its surface and composed of intersecting grooves by which the ribs and outlining or frame portions are produced, and means adjacent the cylinder for deforming the ribs so as to make the shape of the ribs substantially uniform on both sides.

4. The method of forming storage battery grids which consists in casting grids in a part having a grid mold whose depth is substantially the thickness of the grid, drawing the molded grid from the mold, and deforming the ribs of the grid so as to make them substantially the same on both sides of the grid.

5. The method of forming storage battery grids which consists in pouring metal onto the surface of a moving member having contiguous grid forming molds formed in its surface so as to form a strip of grids, taking the strip from said member and finishing the ribs of the grid so as to make them effective for holding active material.

6. The method of forming storage battery grids which comprises pouring metal onto the surface of a cylinder having a continuous strip of grid forming molds formed in its surface and composed of intersecting rib and frame forming grooves, conducting the strip thus formed from the cylinder and passing it between finishing rolls which reshape the ribs so as to make them effective for holding active material.

7. In an apparatus for forming storage battery grids, a cylinder having a series of spaced circumferential grooves intersected by transverse grooves which form grid molds, and a stripper comb having teeth engaging in said circumferential grooves for stripping said molded grids from said cylinder.

8. In casting apparatus, a rotatable cylinder having mold recesses formed in the exterior surface thereof, a crucible having a pouring slot positioned to discharge molten metal into said recesses, and means positioned in the crucible walls adjacent to said pouring slot on both sides thereof for heating the crucible and contents.

In testimony whereof, I hereunto affix my signature.

JOHN PRACHAR.